S. S. GOSSARD & J. E. CRANDALL.
HEADLIGHT CONTROL.
APPLICATION FILED OCT. 30, 1916.
1,271,565.
Patented July 9, 1918
2 SHEETS—SHEET 1.
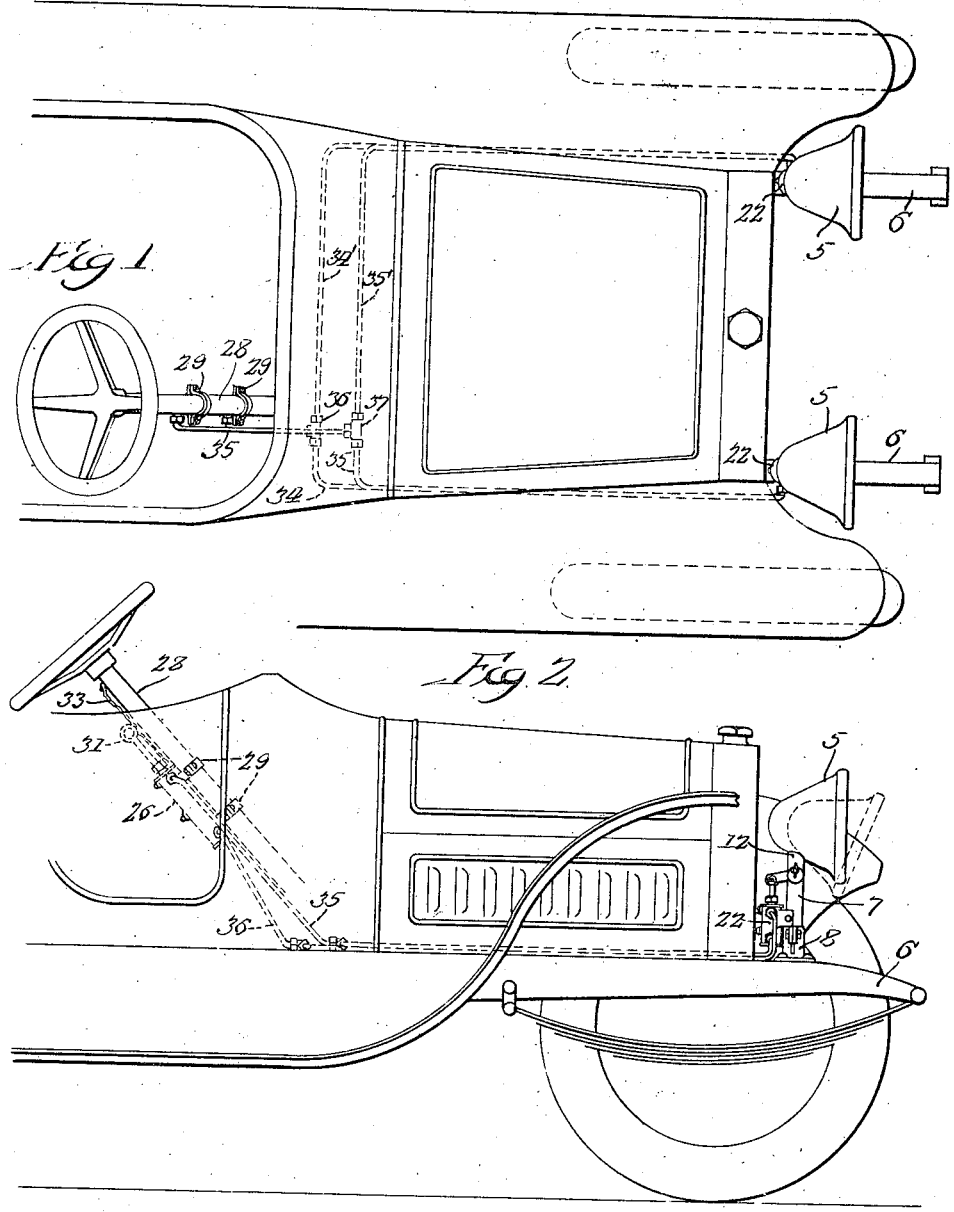
Inventors:
Samuel S. Gossard
Jay E. Crandall
By Pond & Wilson
Attys.

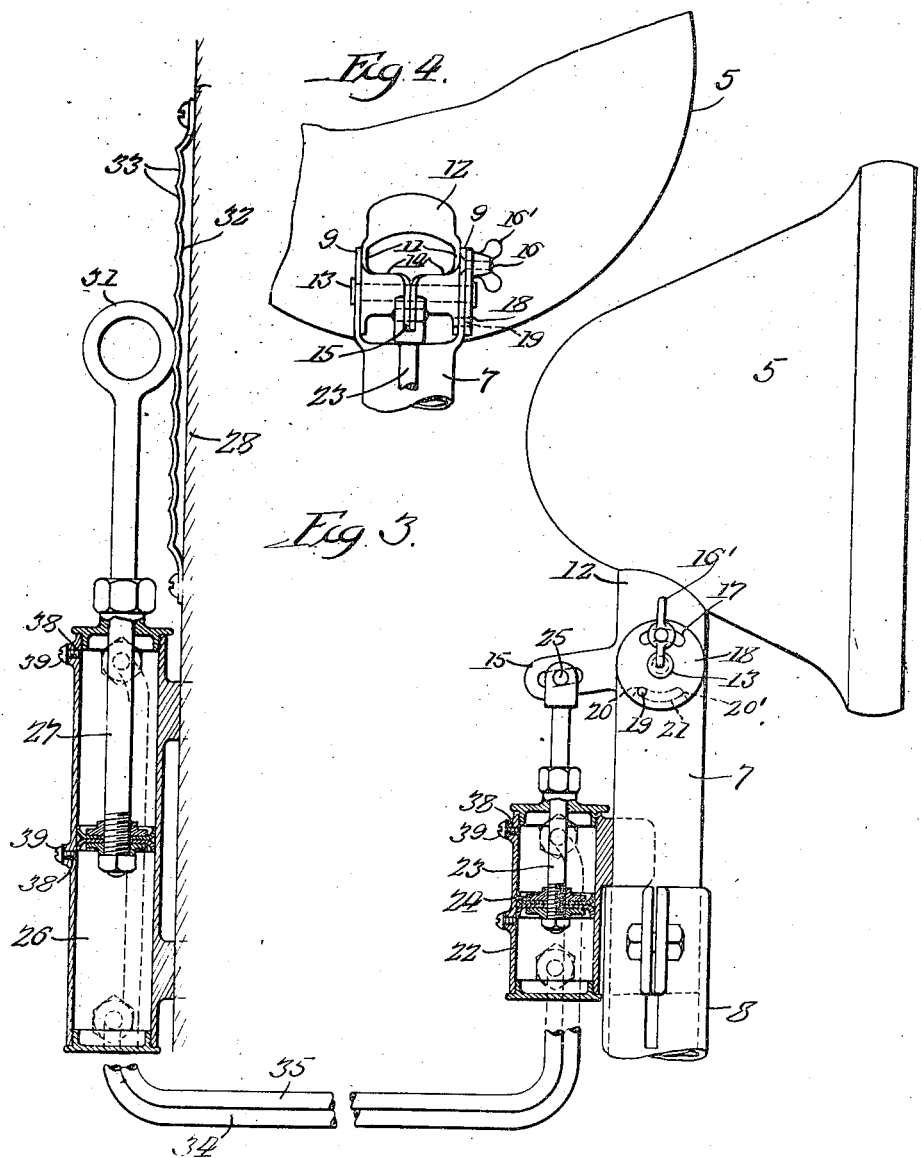

UNITED STATES PATENT OFFICE.

SAMUEL S. GOSSARD AND JAY E. CRANDALL, OF BELVIDERE, ILLINOIS.

HEADLIGHT CONTROL.

1,271,565.　　　　　Specification of Letters Patent.　　　Patented July 9, 1918.

Application filed October 30, 1916.　Serial No. 128,594.

*To all whom it may concern:*

Be it known that we, SAMUEL S. GOSSARD and JAY E. CRANDALL, citizens of the United States, residing at Belvidere, in the county of Boone and State of Illinois, have invented certain new and useful Improvements in Headlight Controls, of which the following is a specification.

This invention relates to headlights and similar illuminating means carried by vehicles, and has more particular reference to means for controlling movement of the headlights with respect to the vehicle. The movement in this instance is for the purpose of tilting the headlights forwardly and downwardly from a normal operative position so as to throw the rays of light downwardly onto the road directly in front of the vehicle to thus avoid the well recognized objections to a glaring light in the face of one approaching from ahead.

We are aware that strictly mechanically operated devices have been heretofore employed for tilting headlights forwardly from a normal position for the purpose mentioned, but because of the varying conditions imposed by the different constructions of motor cars and other vehicles, the levers, links, etc., employed in the connections must be specially designed and adapted to each vehicle, making it difficult and, in fact, impossible to follow a standard construction. Furthermore, since the mechanical connection must extend from the front of a vehicle to a point in proximity to the operator's seat the variously arranged motor mechanism and parts in the intermediate space often prohibits the use of a simple and practical connection and specially constructed connections must be employed. As a consequence of these difficulties, headlight controls of the character described have not been satisfactory for practical purposes.

The primary object of our invention is to overcome the objectionable features mentioned by the provision of a novel headlight control means peculiarly adapted for simple and easy application to any vehicle and to serve in a practical manner the purposes desired.

An important feature of our novel headlight control resides in the provision of means operating through the agency of a fluid to transmit motion from an operating member to the headlights. By employing a fluid effecting a positive connection between the operable parts, the difficulties encountered by the use of strictly mechanical connections are avoided, and it is a comparatively simple matter to run suitable piping from the headlights, generally positioned at the front of a vehicle, to a point in proximity to the operator's seat, since piping may be easily adapted to any number of turns or angles necessary to avoid parts of the mechanism, and moreover, is stationary and hence may be passed through places wherein it would be impossible to employ a moving connection.

Another object is to provide fluid-operated means designed so that the headlights of a vehicle may be moved in unison at will upon operation of a single member located conveniently close to the driver's seat or at any position on the vehicle so as to be readily accessible.

A further object is to provide a headlight control of the character described including adjustments to regulate the range of movement of the headlights so that in applying the headlight control to different vehicles in which the position of the headlights with respect to the ground is different, the proper working angle of the lights may be easily obtained and their range of vertical swinging movement governed.

These and other objects and attendant advantages of the invention will be better understood by reference to the following description when considered in connection with the accompanying drawings, in which—

Figure 1 is a plan view of the front end of an automobile showing one embodiment of our improved headlight control attached thereto;

Fig. 2 is a side elevation of our improvements shown in Fig. 1;

Fig. 3 is a somewhat fragmentary enlarged view of our improvements detached from the vehicle and shown in vertical section so as to better illustrate the construction; and Fig. 4 is a fragmentary rear view of the headlight mounting.

In the drawings, we have illustrated one practical embodiment of our invention as applied to an automobile of conventional design. In this instance, the headlights 5 are mounted in the usual location on the forward ends of the side channel bar 6 of the chassis, although it should be understood that they might be suitably mounted in any other location. A tubular standard designated generally by reference character 7, serves to support each headlight and is clamped at its lower end in a suitable bracket 8, secured to the channel bar 6 so as to be capable of rotatable and lengthwise adjustment in said bracket.

Since the mounting of each headlight is similar and individual means of similar construction is employed for tilting each headlight and is controlled by an operating means common to both of said individual lamp tilting means, we have illustrated in detail the construction of the mounting and means for operating but one of the headlights. Referring to Figs. 3 and 4, the upper end of the tubular standard 7 is shaped to provide forked flat arms 9 between which are interposed the forked arms 11 of the tubular neck piece 12 of the headlight. A pin 13 pivotally connects the arms 9 and 11 so that the headlight may be tilted in a vertical plane. As shown in Fig. 4, the arms 11 are provided with converging extensions 14 jointly forming a rearwardly extending arm 15 at an obtuse angle to the neck piece 12, to which arm the operating means described later is connected. Means is provided for limiting the range of tilting movement of the headlight and consists of a threaded pin 16 fixed to one of the arms 9 of the standard 7 and passing through the arcuate slot 17 of a disk 18 pivotally mounted on the pin 13 and equipped with a fixed pin 19 passing through an arcuate slot 21 in the arm 9 diametrically opposite the slot 17 and projecting into a similar slot in the adjacent arm 11. A thumb nut 16' threaded onto the pin 16 serves to clamp the disk 18 fixedly to the arm 9 so as to hold the pin 19 in fixed position. This pin 19 acts as a stop against which the opposite ends 20 and 20' of the slot in the arm 11 will abut for the purpose of limiting the tilting movement of the headlight. As shown in Fig. 3, the end 20 of the opening in the arm 11 is in engagement with the stop 19 so that tilting movement of the headlight in a counterclockwise direction is prevented. The position of the stop 19 determines the range of movement of the headlight, and it follows that by adjusting the disk 18 to correspondingly adjust the pin 19 the range of tilting movement of the headlight with respect to the horizontal may be varied, it being understood that such adjustment is made by loosening the thumb nut 16' to permit adjustment and by tightening the nut to set the stop 19 in fixed position. Since headlights are placed in different positions on vehicles and at different distances from the ground and that slight variations in the angle at which a headlight is set causes considerable difference with respect to the points the light rays strike the ground, it will be obvious that in mounting headlights on vehicles of various design it is very necessary to be able to accurately adjust the headlights so that they will focus properly on the road. It will be manifest that by reason of the means just described for limiting the tilting movements of the headlight, our improvements may be mounted at different heights from the ground and may be very easily adjusted by properly positioning the disk 18 to secure the proper focusing of the headlights.

Means operated through the medium of a fluid is provided for tilting the headlight and for holding it in set position and consists, generally stated, of a cylinder and a piston therefor connected directly to the arm 15 so that reciprocable movement of the piston will tilt the headlight, and a confined body of fluid movable at the will of an operator for the purpose of tilting the headlight. The cylinder 22 has associated therewith a piston 23 passing through a packed joint at one end of the cylinder and equipped with a piston head 24 of suitable construction and a bifurcated end connected by means of a pin 25 with the arm 15, the latter being formed with a suitable slot to allow for the necessary relative movement between the piston and said arm. A second cylinder 26 of substantially twice the capacity of the cylinder 22 may be suitably mounted on the steering post 28 as by means of detachable clamps 29, or may be mounted at any other point conveniently within reach of an operator and has associated therewith a piston 27 similar to the piston 23 with the exception that it is equipped with a suitable handle 31 yieldingly engageable with a spring plate 32 secured to the steering post 27. This plate 32 is provided with notches 33 in any of which the handle 31 is adapted to engage upon moving said handle lengthwise to thus move the piston in the cylinder, the piston being held in any position to which it has been moved by reason of the engagement of the handle 31 with the notches of the plate 32. The cylinders 22 and 26 are connected by means of pipes 34 and 35, the pipe 34 connecting the upper end of the cylinder 22 with the lower end of the cylinder 26 and the pipe 35 connecting the lower end of the cylinder 22 with the upper end of the cylinder 26. The pipes 34 and 35 are provided with T-joints 36 and 37, respectively, from which pipe sections 34' and 35' lead to the cylinder 22 of the other headlight.

The several movable parts are shown in the drawings as maintaining the headlights in normal operative position, that is, so that the rays of light therefrom will be directed straight ahead to strike the ground a desired distance from the vehicle, the faces 20 by abutment against their respective pins 19 limiting the upright position of the headlights. The cylinders 22 and 26 both above and below their respective piston heads and the pipes 34 and 35 are filled with a suitable fluid, such as oil, openings 38 being provided for the purpose of supplying the fluid, and are closed by suitable means such as screw plugs 29. It will be apparent that since there is a full body of oil between both sides of the pistons in the cylinders 22 and 26, when the piston 27 is moved either upwardly or downwardly similar movement will be imparted to the pistons 23 through the agency of the fluid, and by moving the pistons 23 the headlights will be tilted. Since the body of oil constitutes a movable but substantially positive connection between the pistons 27 and pistons 23, the latter will be moved in unison by and with the piston 27. From Fig. 3, it will be seen that the cylinder 26 has twice the capacity of the cylinders 22. In other words, it has an oil capacity equal to that of both the cylinders 22. Thus, in drawing the handle 31 upwardly to the full extent of its movement the fluid above the head of the piston 27 and in the piping 35 will be moved to act on the fluid beneath the piston head 24, so as to raise the same, the fluid above the piston heads 24 and in the piping 34 being simultaneously moved so as to occupy the space in the cylinder 26 below its piston head. The pistons 23 upon being raised will tilt the headlights forwardly and downwardly until the faces 20' on the arms 11 abut against the stop 19, thereby directing the rays of light to a comparatively small zone sufficiently extended from the vehicle to illuminate the roadbed immediately in advance of the same to enable the vehicle to be properly guided, but removing the glare of the headlights from one approaching from ahead. Upon depressing the piston 27 the fluid will be moved in reverse directions so as to tilt the headlights upwardly to normal position, limited by the faces 20 and stops 19, it being obvious that the headlights might be set at any of various angles between the limits defined by the faces 20 and 20', by engaging the head 31 of the piston 27 in any of the notches 33 intermediate its extreme end notches.

It is believed from the foregoing that the ready adaptability of our improved headlight control to vehicles of various design will be apparent, since the connection between the operating member and the headlights being through the medium of a fluid and conveyed by piping may be suitably shaped to meet any condition. Also, because of the fact that the housing for the fluid connection is stationary there is no requirement, nor provision need be made, for movements as in mechanically connected devices, or for interference with parts of the mechanism, since the piping may be run along a side of the hood or frame or other fixed parts entirely out of the way of the motor or its parts. It should be understood that while we have shown for purposes of illustration one working embodiment of the invention, various changes in the arrangement and construction of parts might be made without departing from the spirit and scope of the invention as expressed in the appended claims.

We claim:

1. A headlight control for motor vehicles, comprising a pair of headlight standards, a headlight pivotally mounted on each standard, a cylinder also mounted on each standard and provided with a piston, a connection between each piston and headlight for oscillating the latter by movement of the piston, a third cylinder of substantially twice the capacity of the pair of cylinders, a piston for the third cylinder reciprocable at the will of an operator, and pipe connections between the ends of the cylinders arranged so that upon moving the piston of the third cylinder back and forth the pistons of both headlight cylinders will be oscillated back and forth substantially in unison through the agency of a liquid contained in the cylinders and pipe connections.

2. A headlight control for motor vehicles comprising a pair of pivotally mounted headlights, a cylinder for each headlight having a piston connected to its respective headlight so that upon reciprocation of the piston its headlight will be oscillated, a third cylinder of a capacity substantially twice that of the pair of cylinders and equipped with a piston adapted to be reciprocated at will by an operator, pipe connections between the cylinders, and a liquid substantially filling the cylinders and connections so as to provide a positive and movable connection between the pistons thereof, the pipe connections being arranged so that upon movement of the piston of the third cylinder in one direction both pistons of the pair of cylinders will be moved substantially in unison in one direction and upon moving the piston of the third cylinder in the reverse direction the pair of pistons will be correspondingly moved.

3. In a headlight control the combination of a supporting standard, a headlight pivotally mounted thereon so as to be capable of swinging to different operative positions and having a part connected therewith provided with an arcuate opening concentric with the pivot axis of the headlight, a stop located in said arcuate opening for defining the pivotal movement of the headlight in both directions, means for adjusting said stop to thereby change the range of pivotal movement of the headlight, and means for moving the headlight back and forth about its pivot axis within the defined range of movement.

4. In a headlight control, the combination of a supporting standard, a headlight pivotally mounted thereon, a member mounted on the standard so as to be adjustable about the pivot axis of the headlight, and means carried by said member and coöperable with the headlight for limiting the range of pivotal movement thereof, whereby upon adjusting said member on the standard the range of pivotal movement of the headlight will be changed.

5. In a headlight mounting, the combination of a pivotally mounted headlight, means for oscillating the headlight about a given axis, means separate from said oscillating means for limiting the pivotal movement of the headlight about said axis in both directions, and means for adjusting the position of said limiting means to thereby change the range of pivotal movement of the headlight.

6. In a headlight support, the combination of a standard, a headlight pivotally mounted thereon and associated with one side of the same, a member adjustably mounted on the opposite side of the standard, the standard and headlight having arcuate openings in substantial alinement, said member having a part extending through the arcuate opening in the standard and into that in the headlight, whereby to limit pivotal movement of the latter by contact against the ends of its arcuate opening, and means for adjusting said member and for securing it in adjusted position for changing the range of pivotal movement of the headlight.

7. A headlight control for vehicles comprising a pair of headlights pivotally mounted, a cylinder for each headlight, a piston for each cylinder connected with its respective headlight and reciprocable to oscillate the headlight, means for limiting the pivotal movement of the headlights in opposite directions so that each headlight may swing through a predetermined arc, a conduit connecting both cylinders so that the movement of a headlight in one direction will be transmitted through the agency of fluid within the conduit and opposed by the other headlight, and means for applying the fluid under pressure to both pistons for moving their respective headlights the full extent allowed by said limiting means, whereby retractive movement of one headlight relative to the other will be precluded.

8. In a headlight control for vehicles, the combination with a pair of pivotally mounted headlights, of means for limiting the pivotal movement of each headlight in opposite directions so that each will be capable of oscillating through a predetermined arc, operating means under the control of an operator for moving the headlights from one extreme position to the other, and means allowing the first named means to be adjusted independently of the operating means for changing the vertical range of oscillation of the headlights without substantially changing the extent of their oscillation, whereby the headlights may be moved by said operating means through a given arc in any of various ranges of movement according to the adjustment of said first named means.

SAMUEL S. GOSSARD.
JAY E. CRANDALL.